US010608467B2

(12) United States Patent
Sharifipour (10) Patent No.: US 10,608,467 B2
(45) Date of Patent: Mar. 31, 2020

(54) SUPPLYING ELECTRICAL POWER TO MULTIPLE LOADS FROM MORE THAN ONE POWER SOURCE

(71) Applicant: KATERRA INC., Menlo Park, CA (US)

(72) Inventor: Bahman Sharifipour, Newington, NH (US)

(73) Assignee: KATERRA INC., Menlo Park, CA (US)

( * ) Notice: Subject to any disclaimer, the term of this patent is extended or adjusted under 35 U.S.C. 154(b) by 205 days.

(21) Appl. No.: 15/869,555

(22) Filed: Jan. 12, 2018

(65) Prior Publication Data
US 2019/0222058 A1 Jul. 18, 2019

(51) Int. Cl.
*H02J 9/06* (2006.01)
*H02J 3/00* (2006.01)

(52) U.S. Cl.
CPC .............. *H02J 9/061* (2013.01); *H02J 3/005* (2013.01); *H02J 2009/068* (2013.01)

(58) Field of Classification Search
CPC ....... H02J 9/061; H02J 2009/068; H02J 3/005
See application file for complete search history.

(56) References Cited

U.S. PATENT DOCUMENTS

| | | | | |
|---|---|---|---|---|
| 5,627,759 A * | 5/1997 | Bearden | ............... | H02J 13/0086 340/661 |
| 6,583,521 B1 * | 6/2003 | Lagod | ..................... | H02J 3/005 307/29 |
| 8,260,695 B1 * | 9/2012 | Rosenberg | ........... | G01R 21/133 323/220 |
| 8,412,614 B2 * | 4/2013 | Bullinger | ............... | G06Q 50/06 705/37 |
| 8,897,923 B2 * | 11/2014 | Haynes | ..................... | H02J 3/14 700/295 |
| 9,256,214 B2 * | 2/2016 | Lee | ......................... | H04L 12/10 |
| 9,520,623 B2 * | 12/2016 | Honma | .................. | H01M 10/44 |
| 9,639,904 B2 * | 5/2017 | Idrees | ........................ | H02J 3/32 |
| 2003/0048004 A1 * | 3/2003 | Fleming | .................. | H02J 3/005 307/64 |
| 2004/0178635 A1 * | 9/2004 | Gray, Jr. | .................. | B60K 6/10 290/40 C |

(Continued)

FOREIGN PATENT DOCUMENTS

WO WO-2015073996 A2 * 5/2015
WO WO-2017008055 A1 * 1/2017 .......... B60L 11/1846

*Primary Examiner* — Pinping Sun
(74) *Attorney, Agent, or Firm* — Maschoff Brennan (57) ABSTRACT

According to an aspect of an embodiment, a method may include supplying electrical power to a plurality of sub-loads. The method may include obtaining a power demand of each sub-load of a plurality of sub-loads. The method may include obtaining an amount of available secondary power of a secondary power source. The method may further include connecting, the secondary power source instead of a primary power source to a subset of sub-loads based on an aggregate power demand of the subset of sub-loads being less than the amount of available secondary power. The method may further include connecting the primary power source instead of the secondary power source to a particular sub-load based on a sum of a particular demand of the particular sub-load and the aggregate power demand exceeding the amount of available secondary power.

17 Claims, 3 Drawing Sheets

(56) References Cited

U.S. PATENT DOCUMENTS

| | | | |
|---|---|---|---|
| 2005/0128659 A1* | 6/2005 | Hibi | H02J 3/005 361/20 |
| 2005/0235865 A1* | 10/2005 | Kumar | B60L 9/16 105/61 |
| 2010/0023786 A1* | 1/2010 | Liberman | H02J 3/14 713/320 |
| 2011/0252247 A1* | 10/2011 | Yokoyama | H02J 7/34 713/300 |
| 2012/0319471 A1* | 12/2012 | Miller | B60L 3/0046 307/9.1 |
| 2013/0060392 A1* | 3/2013 | Wang | H02J 3/28 700/291 |
| 2013/0081394 A1* | 4/2013 | Perry | F03G 6/005 60/641.8 |
| 2014/0018969 A1* | 1/2014 | Forbes, Jr. | H02J 3/32 700/295 |
| 2014/0058577 A1 | 2/2014 | Erhart et al. | |
| 2015/0121113 A1* | 4/2015 | Ramamurthy | H02J 9/061 713/340 |
| 2017/0346292 A1* | 11/2017 | Handelsman | H02J 3/14 |
| 2018/0201142 A1* | 7/2018 | Galin | H02J 3/382 |
| 2018/0358839 A1* | 12/2018 | Perez | H02J 9/061 |
| 2019/0052075 A1* | 2/2019 | Dent | H02H 7/1227 |
| 2019/0052089 A1* | 2/2019 | Ganireddy | H02J 3/383 |

\* cited by examiner

SUPPLYING ELECTRICAL POWER TO MULTIPLE LOADS FROM MORE THAN ONE POWER SOURCE

FIELD

The embodiments discussed herein are related to supplying electrical power to multiple loads from more than one power source.

BACKGROUND

Electrical utility companies may supply electrical power to consumers through an electrical grid. The electrical utility companies may use meters to measure consumption of the consumers. In some instances, particular consumers may have secondary electrical power sources that the particular consumers may use to supply secondary electrical power.

SUMMARY

According to an aspect of an embodiment, a method of supplying electrical power to a plurality of sub-loads is disclosed. The method may include obtaining a power demand, for a particular time period, of each sub-load of a plurality of sub-loads. Each of the sub-loads may be supplied primary power of a primary power source. The method may further include obtaining an amount of available secondary power of a secondary power source that is available for the particular time period. The method may further include connecting, during the particular time period, the secondary power source instead of the primary power source to a subset of sub-loads of the plurality of sub-loads based on an aggregate power demand of the subset of sub-loads being less than or equal to the amount of available secondary power. The method may further include connecting, during the particular time period, the primary power source instead of the secondary power source to a particular sub-load of the plurality of sub-loads, the particular sub-load not being included in the subset, based on a sum of a particular demand of the particular sub-load and the aggregate power demand exceeding the amount of available secondary power.

The object and advantages of the embodiments will be realized and achieved at least by the elements, features, and combinations particularly pointed out in the claims.

It is to be understood that both the foregoing general description and the following detailed description are given as examples and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Systems and methods related to supplying electrical power to multiple loads from more than one power source are disclosed in the present disclosure.

Electrical utility companies may supply electrical power to consumers through an electrical grid. The electrical utility companies may use meters to measure consumption of the consumers. In some instances, each consumer may be connected to the electrical grid through a meter that measures consumption. Metering may allow the electrical utility companies to accurately bill the consumers for the electrical power provided by the electrical utility company. In the present disclosure, connections to the electrical grid that are between the electrical grid and the meter may be referred to as pre-meter, or before the meter. Also, in the present disclosure, connections to the electrical grid that are between the meter and power consumption may be referred to as post-meter or after the meter.

In some instances laws may prevent consumers from connecting anything to the electrical grid before the meter. These laws may seek to prevent unmetered consumption of electrical power. For example, these laws may make it illegal for a consumer to connect a power consuming device, such as, for example an air conditioner unit, to the electrical grid before the meter. Pre-meter connections may be illegal at least because, for example, the air conditioning unit may consume power that the electrical company may not accurately measure and thus may not be able to accurately bill for.

In some instances a particular consumer may have a secondary power source such as, for example a solar cell, or a wind turbine. The particular consumer may supply some or all of the particular consumer's own electrical power from the secondary power source. For example, the particular consumer may connect the secondary power source to an electrical power bus that may distribute electrical power to one or more power consuming devices. In some instances, the particular consumer may connect the secondary power source to a main electrical power bus which may be connected to the electrical grid. The particular consumer may supplement electrical power from the grid with the electrical power from the secondary power source. Additionally or alternatively the particular consumer may disconnect the main electrical power bus from the electrical grid and supply all of the particular consumer's electrical power for a time, or continuously. By supplying some of the particular consumer's own power, the particular consumer may be able to purchase less power from the electrical utility company and thereby save money. It may be important for the particular user to connect the secondary power source to the electrical power bus after the meter such that the meter accurately measures power supplied by the electrical utility company.

In the present disclosure a building or campus may be referred to as an overall load in that the building or campus may include components that may consume power. Additionally, the building or campus may be divided into smaller units that may consume a certain amount of power individually in which each of the smaller units may be a sub-load of the overall load. For example, a campus may include multiple buildings and may be divided into one or more subsets of one or more buildings that may each consume a certain amount of power such that the subsets of buildings may be sub-loads. Similarly, a building may be divided into individual spaces (e.g., floors, apartments, office spaces, sections, wings, departments, different operational facilities, etc.) that may also each consume a certain amount of power such that each of the individual spaces may be sub-loads. In these or other embodiments, the campuses or buildings may be divided according to different systems or components that may consume power such that each system or component may be a sub-load.

In some instances the power consumption of sub-loads may be measured in aggregate by a master meter. In some instances, the power consumption of the multiple sub-loads measured by the master meter may be the overall load or a subset of the overall load. Additionally or alternatively, in some instances power consumption of sub-loads may be individually metered by individual meters despite sharing a common building or campus and/or being collectively monitored by a master meter.

In some instances laws may require that the sub-loads be individually metered despite sharing a common building or campus. In other words, laws may require that each sub-load be isolated from other sub-loads. Additionally or alternatively, there may be other instances in which isolation of different sub-loads with respect to each other may be desired or applicable.

In some instances sub-loads may share electrical power from a secondary electrical power source. For example, an owner of a multi-tenant apartment building with solar cells on the roof may share electrical power from the solar cells between two or more the tenants of the building.

Because of the laws requiring isolation of sub-loads, it may be illegal to connect a secondary power source to part of the campus power distribution network that supplies secondary power to more than one of the sub-loads while also having power from the electrical grid supplied to the sub-loads. For example it may be illegal to connect a secondary power source to a main bus that distributes power from the electrical grid to an overall load that includes multiple sub-loads. Additionally or alternatively it may be undesirable or illegal to connect the secondary power source to the main bus before the individual meters because the individual meters may not be able to accurately measure electrical power supplied by the electrical utility company and the sub-loads may be inaccurately billed. Further, there may be other reasons or instances in which it may be undesirable to connect both a secondary power source and the electrical grid to multiple sub-loads at the same time.

As such, in some embodiments, systems and methods of supplying sub-loads with electrical power from more than one source, such as, for example, the electrical power grid, and a secondary source, without connecting any sub-load to more than one source simultaneously are disclosed. In these or other embodiments, the systems and methods of supplying sub-loads with electrical power from more than one source may be performed such that connections before any individual meters (e.g., individual meters that measure power consumption of an overall load or individual meters that measure power consumption of sub-loads) may be omitted or avoided.

For instance, in some embodiments, the systems and methods may include obtaining a power demand of each sub-load of a group of sub-loads. Additionally or alternatively, an amount of available power of a secondary power source may be obtained. Based on the power demand of one or more sub-loads and the available power of the secondary power source, the one or more sub-loads may be connected to the secondary power source instead of the electrical power grid. Additionally or alternatively, based on the demand of a particular sub-load, the particular sub-load may be connected to the electrical grid instead of the secondary power source.

Additionally or alternatively, in some embodiments an electrical power source may be selected from between the secondary power source and the electrical grid for each sub-load of a group of sub-loads. In some embodiments each sub-load may be connected to the selected electrical power source.

Figure 1:
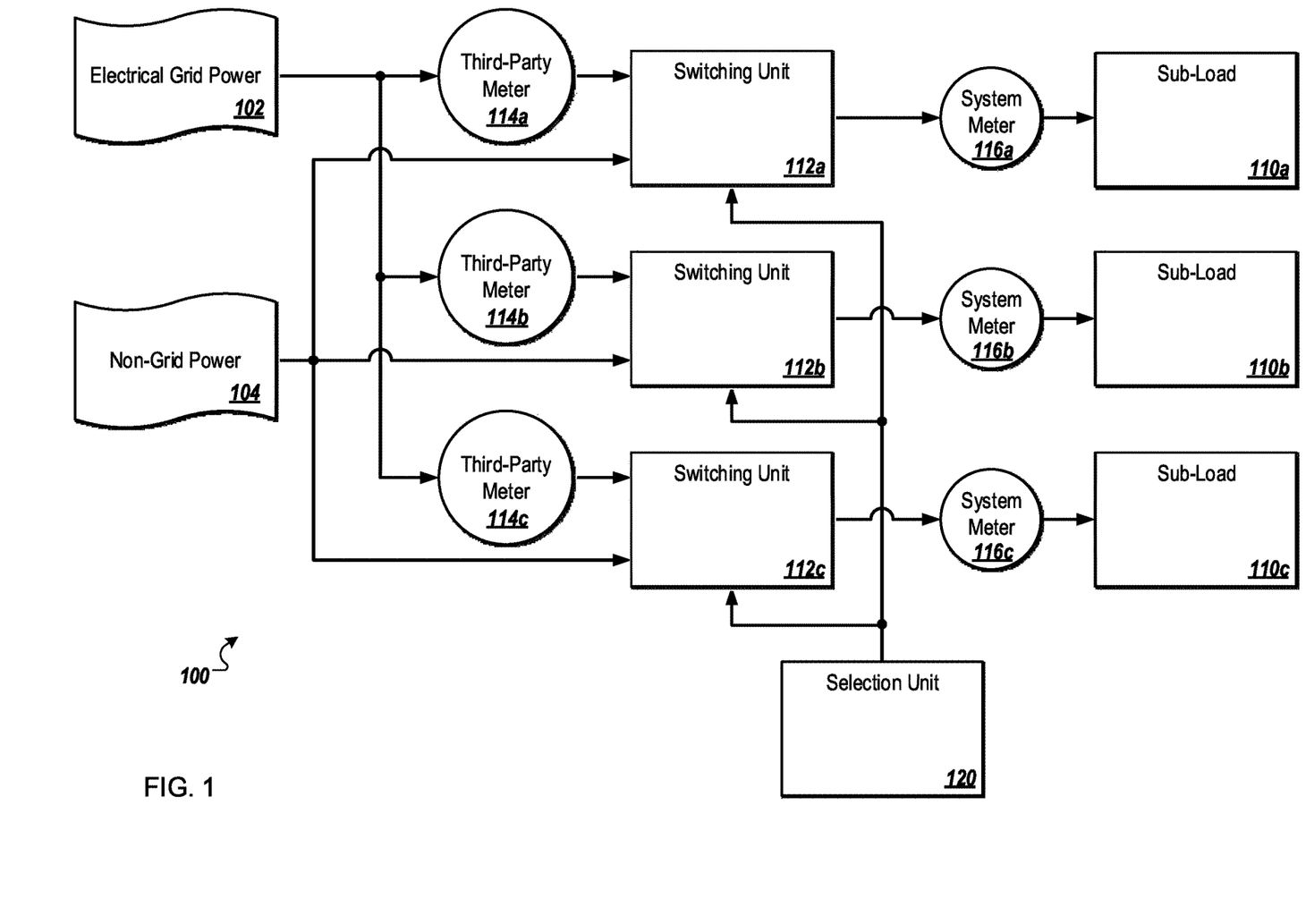
FIG. 1 is a block diagram of an example environment in which the process or system disclosed herein may operate.

FIG. 1 is a block diagram of an example environment in which the process disclosed herein may operate, arranged in accordance with at least one embodiment described in this disclosure. In some embodiments, the environment 100 may include electrical grid power 102, non-grid power 104, one or more sub-loads 110, one or more switching units 112, one or more third-party meters 114, one or more system meters 116, and a selection unit 120. Three sub-loads are illustrated in FIG. 1: first sub-load 110a, second sub-load 110b, and third sub-load 110c (collectively referred to as sub-loads 110 and/or individually referred to as sub-load 110). Three switching units are illustrated in FIG. 1: first switching unit 112a, second switching unit 112b, and third switching unit 112c (collectively referred to as switching units 112 and/or individually referred to as switching unit 112). Three third-party meters are illustrated in FIG. 1: first third-party meter 114a, second third-party meter 114b, and third third-party meter 114c (collectively referred to as third-party meters 114 and/or individually referred to as third-party meter 114). Three system meters are illustrated in FIG. 1: first system meter 116a, second system meter 116b, and third system meter 116c (collectively referred to as system meters 116 and/or individually referred to as system meter 116). However, the number of sub-loads, switching units, third-party meters, and/or system meters may vary according to different implementations.

In general, for a particular time period, the selection unit 120 may obtain a power demand for one or more sub-loads 110. For the particular time period, the selection unit 120 may obtain an amount of available power of the non-grid power 104. During the particular time period, the selection unit 120 may direct a particular switching unit 112, such as, for example, the first switching unit 112a to connect a particular sub-load 110, such as, for example, the first sub-load 110a to the non-grid power 104 instead of the electrical grid power 102. Also, during the particular time period, the selection unit 120 may direct a particular switching unit 112, such as, for example, the second switching unit 112b to connect a particular sub-load 110, such as, for example, the second sub-load 110b to the electrical grid power 102 instead of the non-grid power 104.

In some embodiments, the environment 100 may include the electrical grid power 102 which may include electrical power from an electrical grid. The electrical grid power 102 may include electrical power that has been generated and/or distributed by an electrical utility company. The electrical grid power 102 may include alternating-current electrical power according to any suitable standard, such as, for example, 120 Volt, 60 Hertz, alternating-current electrical power. The electrical grid power 102 may be metered by a master meter.

In some embodiments the environment 100 may include the non-grid power 104 which may include electrical power that is not from the electrical grid. The non-grid power 104 may include power that has been generated by more than one source. The non-grid power 104 may include power generated at or near the sub-loads 110. The non-grid power 104 may include power generated by renewable energy sources, such as, for example, solar cells, wind turbines, or geothermal power stations. Additionally or alternatively, the non-grid power 104 may include power generated by other sources, such as, for example, a gas-burning generator, or a coal-fired generator. Additionally or alternatively the non-grid power 104 may include energy that has been stored, such as, for example in a battery. In some embodiments the non-grid power 104 may include alternating-current electrical power according to any suitable standard. In some embodiments the non-grid power 104 may be related to, or follow the same standard as, the electrical grid power 102. In some embodiments the non-grid power 104 may be synchronized to match the electrical grid power 102. In these or other embodiments the non-grid power 104 may include direct-current electrical power.

In some embodiments the non-grid power 104 or the source of the non-grid power 104 may be measured to produce data about the non-grid power 104 or the amount of available non-grid power 104. Additionally or alternatively the data about the non-grid power 104 may be communicated to the selection unit 120. Additionally or alternatively the data about the non-grid power 104 may include historical data about the non-grid power 104.

In some embodiments the environment 100 may include the sub-loads 110 which may include units of power consumption. In some embodiments the sub-loads 110 may be individually metered. In some embodiments the sub-loads 110 may be related, such as, for example by sharing a common campus or building. For example, a collection of sub-loads 110 may include a single building with multiple subdivisions, such as, for example, floors, office spaces or apartments. Additionally or alternatively a collection of sub-loads 110 may include multiple buildings that are related, such as, for example a university campus, or a group of buildings owned or operated by a single entity. For example, sub-loads 110 may include one or more apartments, one or more office spaces, one or more floors of a building, or one or more buildings of a group of buildings. In some embodiments individual sub-loads 110 may be defined based on all power consumption after individual third-party meters 114. In some embodiments the sub-loads 110 may be defined based on a tenant that is responsible for paying an electrical utility company for power consumed. For example, if an electrical utility company places a particular third-party meter 114 on a particular subdivision of a campus, that particular subdivision of the campus may be referred to as a sub-load 110.

In some embodiments the environment 100 may include the switching units 112 which may include switches capable of connecting the sub-loads 110 to either the electrical grid power 102 or the non-grid power 104. The switching units 112 may include any suitable switching apparatus, such as, for example, a mechanical switch, a solid state switch or a triac switch. The switching units 112 may include a single pole changeover switch, capable of connecting the sub-loads 110 to either the electrical grid power 102 or the non-grid power 104. The switching units 112 may be capable of being controlled by an external signal. For example, the switching units 112 may switch based on a signal from the selection unit 120.

In some embodiments the environment 100 may include the third-party meters 114 which may include any suitable electricity meters capable of measuring electricity from the electrical grid power 102 to the sub-loads 110. The third-party meters 114 may include voltage or current meters. The third-party meters 114 may be installed and/or operated by any third-party that may be independent of the entity that may control, distribute, manage, or provide the selection unit 120 and/or the switching units 112. Additionally or alternatively, the third-party may be unaffiliated with the selection unit 120 and/or the switching units 112. In some instances being unaffiliated with the selection unit 120 and/or the switching units 112 may include not being able to exercise control over or change the selection unit 120 and/or the switching units 112. By way of example, the third party may include or be part of an electrical utility company that provides the electrical grid power 102, another electrical utility company, an entity contracted to monitor the electrical grid power 102, or some other entity. In the present disclosure, the third-party meters 114 may be an example of individual meters. Additionally or alternatively the third-party meters 114 may individually meter power of the electrical grid power 102 supplied to the sub-loads 110.

In some embodiments the environment 100 may include the system meters 116 which may include any suitable electricity meters capable of measuring power delivered to, and/or consumed by the sub-loads 110. The power delivered to and/or consumed by the sub-loads 110 may be from the electrical grid power 102 and/or the non-grid power 104. The system meters 116 may include voltage or current meters. The system meters 116 may be part of or attached to the switching units 112. Additionally or alternatively the system meters 116 may be part of or attached to the sub-loads 110. Additionally or alternatively the system meters 116 may communicate the amount of electrical power consumed by the sub-loads 110 to the selection unit 120. In some embodiments the system meters 116 may store and/or communicate historical data related to the power delivered to and/or consumed by the sub-loads 110.

In some embodiments the environment 100 may include the selection unit 120 which may include code and routines configured to enable a computing system to perform one or more operations to select a power source for one or more sub-loads and to direct the connecting of the sub-loads 110 to a power source. Additionally or alternatively, the selection unit 120 may be implemented using hardware, such as, for example the computing system 200 of FIG. 2, or hardware including a processor, a microprocessor (e.g., to perform or control performance of one or more operations), a field-programmable gate array (FPGA), or an application-specific integrated circuit (ASIC). In some other instances, the selection unit 120 may be implemented using a combination of hardware and software. In the present disclosure, operations described as being performed by the selection unit 120 may include operations that the selection unit 120 may direct a system to perform. In some embodiments the selection unit 120 may be included in, or implemented as part of, an electrical power distribution system such as, for example, the electrical power distributing system disclosed in U.S. patent application Ser. No. 15/724,206, filed on Oct. 3, 2017, which is incorporated by reference in its entirety.

In the present disclosure a system or method, including the selection unit 120, directing the connection of a sub-load to a particular power source may be referred to as the system or method connecting the sub-load to the particular power source. In the present disclosure connecting two points may refer to electrically connecting the two points without regard for anything between the two points. Such as, for example, the connection between the first sub-load 110a and the electrical grid power 102 may include the first third-party meter 114a, the first switching unit 112a, and the first system meter 116a, but, these may not be referenced when referring to connecting the first sub-load 110a to the electrical grid power 102.

In some embodiments the selection unit 120 may obtain a power demand for each of the sub-loads 110 for a particular time period. The selection unit 120 may obtain the power demand from the system meters 116. Additionally or alternatively the selection unit 120 may obtain the power demand from one or more of the third-party meters 114, the switching units 112, the sub-loads 110 and/or another source. Additionally or alternatively, the selection unit 120 may participate in determining the power demand.

The power demand for the particular time period may include the current time. Additionally or alternatively the power demand for the particular time period may include a prediction of a power demand for a future time period. For example, the power demand may include the current time and the immediately subsequent hour; or the power demand may include the following day with or without including the current day.

The predictions of the power demand may be based on one or more of historical data of the power demand, a weather forecast, the current season, the current day of the week, the current day of the year, and/or an event occurring during the particular time period. The predictions of power demand may be calculated deterministically based on a stochastic model that estimates probabilities of events occurring. For example, the prediction of power demand may be based on the power demand of the previous day, or the previous weekday, or the same calendar day from a previous year. For another example if the weather forecast indicates that the day will be relatively hot, the prediction of power demand may be higher than typical, to account for additional power consumption related to air conditioning. For another example, if the day is a national holiday, and the sub-load is operated by a business that may not be open for business on the national holiday, the prediction of the power demand may be lower than typical to account for the sub-load not being open for business.

In some embodiments the selection unit 120 may obtain an amount of available power of the non-grid power 104 ("available non-grid power") for a particular time period. The selection unit 120 may obtain the amount of available non-grid power from the source of the non-grid power, and/or another source. Additionally or alternatively, the selection unit 120 may participate in determining the amount of available power.

The amount of available non-grid power for the particular time period may include the current time. Additionally or alternatively the amount of available non-grid power for the particular time period may include a prediction of an amount of available non-grid power for a future time period.

The predictions of the amount of available non-grid power may be based on one or more of historical data of the amount of available non-grid power, efficiencies of conversion of energy from one form to another, a weather forecast, and/or the current season. The predictions of the amount of available non-grid power may be calculated deterministically based on a stochastic model that estimates probabilities of events occurring. For example, the prediction of the amount of available non-grid power may be based on the amount of available non-grid power of the previous day. For another example if the weather forecast indicates that a particular day will be cloudy, and the source of the non-grid power 104 is in part solar cells, the prediction of the amount of available non-grid power for time periods during the particular day may be lower than typical to account for the predicted diminished power generation of the solar cells.

In some embodiments the selection unit 120 may direct one or more switching units 112 to connect the one or more sub-loads 110 to which the switching units 112 are connected to the non-grid power 104 instead of the electrical grid power 102. The connecting of the sub-loads 110 to the non-grid power 104 instead of the electrical grid power 102 may include disconnecting the sub-loads 110 from the electrical grid power 102. By directing the connecting of the sub-loads 110 to the non-grid power 104 instead of the electrical grid power 102, the method or system of the present disclosure may be supplying sub-loads with electrical power from more than one source, without connecting any sub-load to more than one source simultaneously.

In some embodiments the connecting of one or more of the sub-loads 110 to the non-grid power 104 instead of the electrical grid power 102 may include synchronizing power of the non-grid power 104 with power of the electrical grid power 102. Additionally or alternatively the connecting of the sub-loads 110 to the electrical grid power 102 instead of the non-grid power 104 may include synchronizing power of the non-grid power 104 with power of the electrical grid power 102. The synchronization of the non-grid power 104 to match the electrical grid power 102 may be done at any time, for example, the non-grid power 104 may be synchronized to match the electrical grid power 102 before the sub-loads loads 110 are disconnected from the electrical grid power 102 and/or before the sub-loads 110 are connected to the non-grid power 104. Additionally or alternatively, in some embodiments, it may be that the power of the electrical grid power 102 is synchronized to match the power of the non-grid power 104.

For example, the electrical grid power 102 may supply the first sub-load 110a with alternating-current electrical power. The alternating-current electrical power may have electrical properties, which may include voltage, current, and frequency. The electrical properties may change over time, and/or periodically. So, at any time the voltage, for example, may include an amplitude and a phase. The process of synchronizing power of the non-grid power 104 to match power of the electrical grid power 102 may include altering the power of the non-grid power 104 such that one or more of the electrical properties of the power of the non-grid power 104 matches the electrical properties of the power of the electrical grid power 102.

It may be that synchronization is done with respect to the electrical properties of the power that is being supplied to individual sub-loads. For example, power of the electrical grid power 102 being supplied to the first sub-load 110a may be 120 degrees out of phase from power of the electrical grid power 102 being supplied to the second sub-load 110b. So, synchronizing power of the non-grid power 104 to match the power of the electrical grid power 102 may be accomplished with respect to the differences in the power being supplied to individual sub-loads 110.

As an example of synchronizing, in connecting the first sub-load 110a to the non-grid power 104 instead of the electrical grid power 102, the power of the non-grid power 104 supplied to the first sub-load 110a may be synchronized to match the power supplied to the first sub-load 110a by the electrical grid power 102. For example, the phase, amplitude, and/or frequency of the power supplied by the non-grid power 104 to the first sub-load 110a may be synchronized to match the phase, amplitude and/or frequency of the power supplied by the electrical grid power 102 to the first sub-load 110a. Synchronizing power of the non-grid power 104 to match power of the electrical grid power 102 for connecting the sub-loads 110 to the non-grid power 104 instead of the electrical grid power 102 may reduce disruption in power supplied to the sub-loads 110.

Further, in some embodiments, the connecting of the sub-loads 110 to the non-grid power 104 instead of the electrical grid power 102 may include connecting the sub-loads 110 to the non-grid power 104 and instead of the electrical grid power 102 at a time that power of the electrical grid power 102 being supplied to the sub-loads 110 has low or zero voltage. Additionally or alternatively the connecting of the sub-loads 110 to the electrical grid power 102 instead of the non-grid power 104 may include connecting the sub-loads 110 to the electrical grid power 102 and instead of the non-grid power 104 at a time that the power of the non-grid power 104 being supplied to the sub-loads has low or zero voltage.

For example, the electrical grid power 102 supplied to the first sub-load 110a may be alternating-current electrical power with voltage that varies following a sinusoidal pattern which includes voltages greater than zero and voltages less than zero. The connecting of the first sub-load 110a to the non-grid power 104 instead of the electrical grid power 102 may occur at a time when the power supplied to the first sub-load 110a may be zero. Because the power supplied by the non-grid power 104 to the first sub-load 110a may be synchronized to match the power supplied by the electrical grid power 102 to the first sub-load 110a both the power supplied by the electrical grid power 102 to the first sub-load 110a and the power supplied by the non-grid power 104 to the first sub-load 110a may be near zero at the same time. Connecting the sub-loads 110 to the non-grid power 104 instead of the electrical grid power 102 during a period of low or zero voltage may reduce disruption in power supply at the sub-loads 110.

The connection of a particular sub-load 110 to the non-grid power 104 instead of the electrical grid power 102 may be based on the aggregate power demand of the particular sub-load 110 for the particular time period being less than or equal to the amount of available power of the non-grid power 104 for the particular time period. For example, if the aggregate power demand of a particular subset of sub-loads for a particular time period is less than amount of available power of the non-grid power 104 for the particular time period, the selection unit 120 may direct the switching units 112 to connect the particular sub-load 110 to the non-grid power 104 instead of the electrical grid power 102.

In some embodiments the selection unit 120 may direct one or more switching units 112 to connect the one or more sub-loads 110 to which the switching units 112 are connected to the electrical grid power 102 instead of the non-grid power 104. The connecting of the sub-loads 110 to the electrical grid power 102 instead of the non-grid power 104 may include disconnecting the sub-loads 110 from the non-grid power 104. By directing the connecting of the sub-loads 110 to the electrical grid power 102 instead of the non-grid power 104, the method or system of the present disclosure may be supplying sub-loads with electrical power from more than one source, without connecting any sub-load to more than one source simultaneously.

The connection of a particular sub-load 110 to the electrical grid power 102 instead of the non-grid power 104 may be based on the aggregate power demand of the sub-loads 110 that are connected to the non-grid power 104 and the power demand of the particular sub-load 110 for the particular time period exceeding the amount of available power of the non-grid power 104 for the particular time period. For example, if the aggregate power demand of a particular subset of sub-loads for a particular time period is greater than amount of available power of the non-grid power 104 for the particular time period, the selection unit 120 may direct a particular switching unit 112 to connect a particular sub-load 110 to the electrical grid power 102 instead of the non-grid power 104.

For a particular time period there may be more than one subset of sub-loads 110 with a power demand that is less than or equal to the amount of available power of the non-grid power 104 for the particular time period. In this case, the selection unit 120 may determine which sub-loads 110 to include in the subset that will be connected to the non-grid power 104 instead of the electrical grid power 102.

For example, if for a particular time period, the first sub-load 110a had a power demand of 50 kilowatts (kW), and the second sub-load 110b had a power demand of 100 kW, and the third sub-load 110c had a power demand of 150 kW, and the available power of the non-grid power 104 was 200 kW the selection unit 120 may determine which subset of the sub-loads 110 to cause to be connected to the non-grid power 104 instead of the electrical grid power 102. For example, the selection unit 120 may cause the first sub-load 110a and the second sub-load 110b to be connected to the non-grid power 104 instead of the electrical grid power 102. Or, the selection unit 120 may cause the first sub-load 110a and the third sub-load 110c to be connected to the non-grid power 104 instead of the electrical grid power 102. Or, the selection unit 120 may cause only one of the first sub-load 110a, the second sub-load 110b, or the third sub-load 110c to be connected to the non-grid power 104 instead of the electrical grid power 102.

In some embodiments the selection unit 120 may determine which subset of sub-loads 110 to cause to be connected to the non-grid power 104 instead of the electrical grid power 102 for multiple time periods. For example, according to the example given above, the selection unit 120 may determine to cause the first sub-load 110a and the second sub-load 110b to be connected to the non-grid power 104 instead of the electrical grid power 102 for a first time period. Then, during a second time period, the selection unit 120 may cause the first sub-load 110a and the second sub-load 110b to be connected to the electrical grid power 102 instead of the non-grid power 104 and the third sub-load 110c to be connected to the non-grid power 104 instead of the non-grid power 104. By selecting which subset of sub-loads 110 is connected to the non-grid power 104 instead of the electrical grid power 102 for multiple periods of time, the method or system of the present disclosure may be supplying sub-loads with electrical power from more than one source, without connecting any sub-load to more than one source simultaneously.

In some embodiments the selection unit 120 may determine which subset of sub-loads 110 to cause to be connected to the non-grid power 104 instead of the electrical grid power 102 for one or more time periods based on secondary power distribution factors. The secondary power distribution factors may include a duration of time that one or more sub-loads 110 has been connected to the non-grid power 104 instead of the electrical grid power 102, a cost of power to one or more sub-loads 110, and a level of service associated with the one or more sub-loads.

As an example of the selection unit 120 using the secondary power distribution factors, the selection unit 120 may seek to balance a total duration time that each of the sub-loads 110 are connected to the non-grid power 104 instead of the electrical grid power 102. For example, 16 hours into a particular day, if the first sub-load 110a has been connected to the non-grid power 104 instead of the electrical grid power 102 for 8 hours, and the second sub-load 110b has been connected to the non-grid power 104 instead of the electrical grid power 102 for 8 hours, the selection unit 120 may determine to connect the third sub-load 110c to the non-grid power 104 instead of the electrical grid power 102 for the remaining 8 hours of the day while keeping the first sub-load 110a and the second sub-load 110b connected to the electrical grid power 102 instead of the non-grid power 104.

Although the example is given in terms of a single day worth of balancing, the selection unit 120 may balance over a week or a billing period or any other suitable period of time. Also, although the example is given at 16 hours into the particular day, the determination of the selection unit 120 regarding which sub-loads 110 to connect to the non-grid power 104 during which periods of the day may be made at any time, including days before the particular day. Additionally or alternatively the determination may be made during the particular day and may be made in response to changes in conditions, such as, for example, a change in the power demand of one or more of the sub-loads 110, a change in the available power of the non-grid power 104, or a change in a cost of power to one or more of the sub-loads 110.

For another example of the selection unit 120 using the secondary power distribution factors, the selection unit 120 may seek to balance cost per hour of power between the sub-loads 110. The cost of electrical grid power 102 may change throughout the day. For example, during peak use hours, the cost of electrical grid power 102 may be higher than during time periods of lower use. For example, the cost of electrical grid power 102 may be highest between the hours of 6:00 PM and 8:00 PM and lowest between the hours of 12:00 AM and 6:00 AM.

As an example of the selection unit 120 balancing cost per hour between sub-loads 110, the selection unit 120 may track the duration of time that each of the sub-loads 110 is connected to the electrical grid power 102 instead of the non-grid power 104 and track the cost of power during those durations for each of the sub-loads 110. The selection unit 120 may then seek to balance the cost per duration multiplied by the duration (independent of the consumption). For example, the selection unit 120 may direct that the sub-load 110a is connected to the electrical grid power 102 instead of the non-grid power 104 for 16 hours of a particular day during which the cost of electrical grid power 102 is $0.10 per kilowatt hour (kWh) and the second sub-load 110b is connected to the electrical grid power 102 instead of the non-grid power 104 for 8 hours of the particular day during which the cost of the electrical grid power 102 is $0.20 per kWh.

For another example of the selection unit 120 balancing cost per hour between sub-loads 110, the selection unit 120 may divide a particular day into cost segments such as, for example, a peak-cost period, a high-cost period, a medium-cost period, and a low-cost period. The selection unit 120 may then balance the duration of connection to the electrical grid power 102 of the sub-loads 110 for each period. For example, the selection unit 120 may direct the connections such that each sub-load 110 is connected to the electrical grid power 102 for about the same amount of time during each of the peak-cost period, the-high cost period, the medium-cost period and the low-cost period.

As an example of the selection unit 120 using the secondary power distribution factors, the selection unit 120 may connect one or more sub-loads 110 to the non-grid power 104 instead of the electrical grid power 102 based on a level of service selected by the party responsible for the one or more sub-loads 110. For example, a particular consumer may pay an owner of a secondary power source for power from the secondary power source at a particular level of service. The selection unit 120 may provide the secondary power from the non-grid power 104 based on the particular level of service. Additionally or alternatively the particular consumer may pay an operator of the selection unit 120 for a particular level of service. The selection unit 120 may then be configured to provide the particular consumer with non-grid power 104 based on the level of service. For example, the particular consumer may pay for non-grid power 104 during peak-cost periods.

To balance the cost per hour between the sub-loads, the selection unit 120 may obtain information about the cost of electrical grid power 102 periodically. Further, the selection unit 120 may obtain predictions about the cost electrical grid power 102 periodically.

In some embodiments the selection unit 120 may make predictions of the cost of electrical grid power 102. The predictions of the cost of electrical grid power 102 may be calculated deterministically based on a stochastic model that estimates probabilities of events occurring. For example, the predictions of the cost of electrical grid power 102 may be based on historical data of the cost of power, a weather forecast, the current season, the current day of the week, the current day of the year, or an event occurring during the particular period of time. For example, a prediction of a high cost of power may correlate with a summer day in which the weather forecast indicates high temperatures.

In some embodiments an existing power distribution system in a campus may be retrofitted with a selection unit 120 and one or more switching units 112 to form the system or implement the methods disclosed in this disclosure.

Modifications, additions, or omissions may be made to the environment 100 without departing from the scope of the present disclosure. For example, although illustrated including third-party meters, in some embodiments the third-party meters 114 may be omitted. For example, some states or some electrical utility companies may not require or employ third-party meters. In these or other cases, the third-party meters may be omitted. For another example, although illustrated as individual switching units 112, there may be a particular switching unit 112 capable of switching between the electrical grid power 102 and the non-grid power 104 for more than one of the sub-loads 110. For another example, the switching units 112 may include a third switching position or option, such as, for example, a disconnected position. For another example, there may be more than one source of non-grid power 104 between which the switching units 112 is configured to switch. Further, the order of operations may vary according to different implementations.

Figure 2:
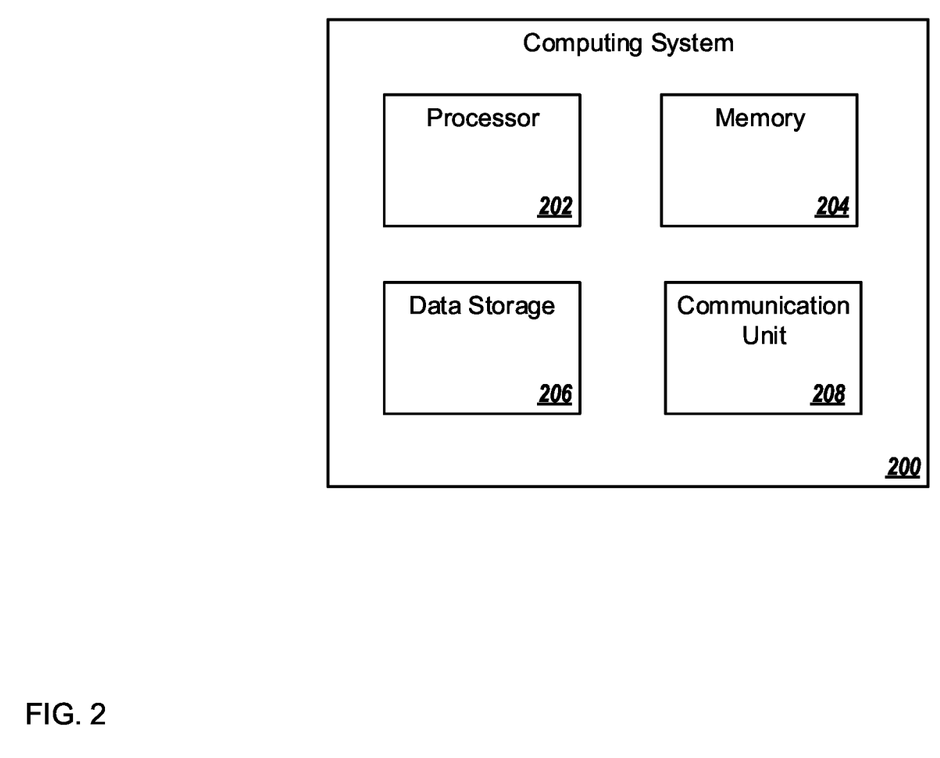
FIG. 2 is a block diagram of an example computing system.

FIG. 2 is a block diagram of an example computing system 200, which may be arranged in accordance with at least one embodiment described in this disclosure. As illustrated in FIG. 2, the system 200 may include a processor 202, a memory 204, a data storage 206, and a communication unit 208.

Generally, the processor 202 may include any suitable special-purpose or general-purpose computer, computing entity, or processing device including various computer hardware or software modules and may be configured to execute instructions stored on any applicable computer-readable storage media. For example, the processor 202 may include a microprocessor, a microcontroller, a digital signal processor (DS), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, it is understood that the processor 202 may include any number of processors distributed across any number of network or physical locations that are configured to perform individually or collectively any number of operations described herein. In some embodiments, the processor 202 may interpret and/or execute program instructions and/or process data stored in the memory 204, the data storage 206, or the memory 204 and the data storage 206. In some embodiments, the processor 202 may fetch program instructions from the data storage 206 and load the program instructions in the memory 204. After the program instructions are loaded into the memory 204, the processor 202 may execute the program instructions, such as instructions to perform one or more operations described with respect to the selection unit 120 and/or the method 300 of FIGS. 1 and 3, respectively.

The memory 204 and the data storage 206 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 202. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations.

The communication unit 208 may be configured to receive any or all of consumption data of one or more sub-loads, including power demand data, available power data of a secondary power source, weather forecast data, information regarding upcoming events, calendar data, and cost data related to the primary power source and to provide any or all of the above listed data to the data storage 206. Additionally or alternatively, the communication unit 208 may be configured to transmit signals to one or more switches.

Modifications, additions, or omissions may be made to the system 200 without departing from the scope of the present disclosure. For example, the data storage 206 may be located in multiple locations and accessed by the processor 202 through a network. Additionally, the system 200 may include other components not explicitly illustrated or described. Additionally or alternatively, the system 200 may not include every component that is explicitly illustrated or described.

Figure 3:
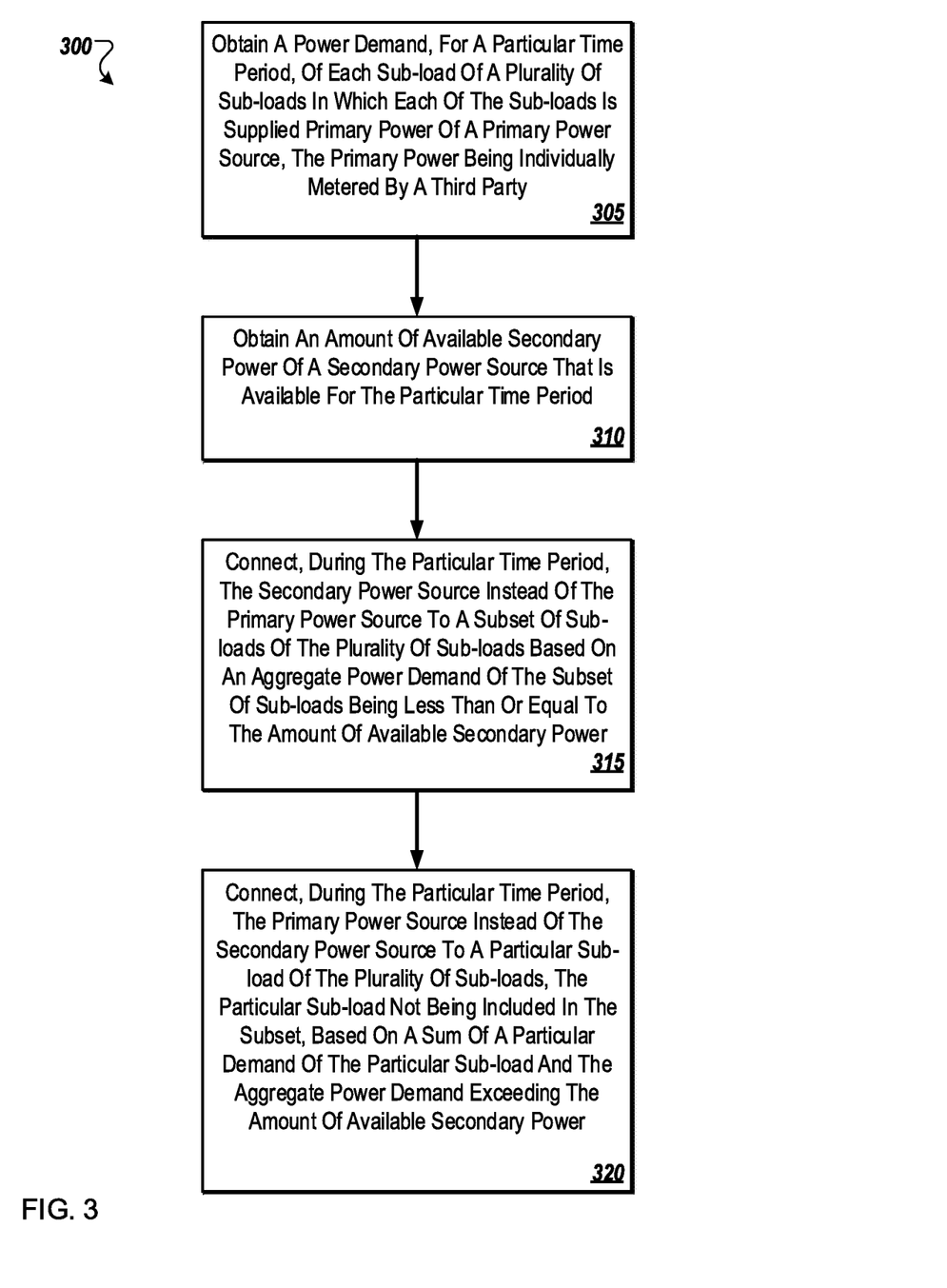
FIG. 3 is a flow chart of an example process for supplying electrical power to multiple loads from more than one power source.

FIG. 3 is a flow chart of an example method 300 configured to supply sub-loads with electrical power from more than one source arranged in accordance with at least one embodiment described in this disclosure. In some embodiments, one or more of the operations associated with the method 300 may be performed by the selection unit 120, and/or the switching units 112 of FIG. 1. The method 300 may be performed by any suitable system, apparatus, or device. For example, the computing system 200 of FIG. 2 may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation. In general, the method 300 may obtain a power demand, obtain an amount of available power from a secondary source, connect sub-loads to the secondary source instead of the primary source, and connect a particular sub-load to the primary source instead of the secondary source.

The method 300 may include the block 305. At the block 305 a power demand for a particular time period for each sub-load of a plurality of sub-loads may be obtained. The sub-loads may be supplied with primary power of a primary power source. The sub-loads may be analogous to the sub-loads 110 of FIG. 1. The primary power may be analogous to the electrical grid power 102 of FIG. 1.

The obtaining of the power demand may include obtaining the current demand for electrical power of each of the sub-loads. Additionally or alternatively the obtaining of the power demand may include a prediction of a power demand for a time in the future. The prediction of the power demand may be based on one or more of historical data of the power demand, a weather forecast, the current season, the current day of the week, the current day of the year, or an event occurring during the particular period of time.

The method 300 may include the block 310. At the block 310 an amount of available power of a secondary power source for the particular time period may be obtained. The secondary power may be analogous to the non-grid power 104 of FIG. 1.

The obtaining of the amount of available power may include obtaining the current amount of available power of the secondary power source. Additionally or alternatively the obtaining of the amount of available power may include a prediction of an amount of available power for a time in the future. The prediction of the amount of available power may be based on one or more of historical data of the amount of available power, a weather forecast, or the current season.

The method 300 may include the block 315. At the block 315 a subset of sub-loads may be connected to the secondary power source instead of the primary power source. The connection of the subset of sub-loads to the secondary power source instead of the primary power source may include disconnecting the subset of sub-loads from the primary power source. The connection of the subset of sub-loads to the secondary power source instead of the primary power source may be based on an aggregate power demand of the subset of sub-loads being less than or equal to the amount of available power of the secondary source.

The connection of the subset of sub-loads to the secondary power source instead of the primary power source may be accomplished by switching units analogous to the switching units 112 of FIG. 1. The connection of the subset of sub-loads to the secondary power source instead of the primary power source may be directed by a selection unit analogous to the selection unit 120 of FIG. 1. By connecting the subset of sub-loads to the secondary power source instead of the primary power source, the method 300 may be supplying sub-loads with electrical power from more than one source, without connecting any sub-load to more than one source simultaneously. The connection of the subset of sub-loads to the secondary power source instead of the primary power source may include synchronizing the power supplied by the secondary power source to one or more sub-loads of the subset of sub-loads to match power supplied by the primary source to one or more sub-loads of the subset of sub-loads.

The method 300 may include the block 320. At the block 320 a particular sub-load may be connected to the primary power source instead of the secondary power source. The connection of the particular sub-load to the primary power source instead of the secondary power source may include disconnecting the particular sub-load from the secondary power source. The connection of the particular sub-load to the primary power source instead of the secondary power source may be based on an aggregate power demand of the subset of sub-loads and the particular sub-load exceeding the amount of available power of the secondary source. The connection of the particular sub-load to the primary power source instead of the secondary power source may be accomplished by switching units analogous to the switching units 112 of FIG. 1. The connection of the particular sub-load to the primary power source instead of the secondary power source may be directed by a selection unit analogous to the selection unit 120 of FIG. 1. By connecting the particular sub-load to the primary power source instead of the secondary power source, the method 300 may be supplying the particular sub-load with electrical power from more than one source, without connecting any sub-load to more than one source simultaneously. The connection of the particular sub-load to the primary power source instead of the secondary power source may include synchronizing the power supplied by the secondary power source to the particular sub-load to match power supplied by the primary source to the particular sub-load.

Modifications, additions, or omissions may be made to the method 300 without departing from the scope of the present disclosure. For example, the order of operations may vary according to different implementations. Additionally or alternatively, one or more operations may be added or omitted.

For example, in some embodiments, the method 300 may include one or more operations related to obtaining a cost of power for the particular time period for each of the sub-loads. In these or other embodiments, the connecting of the secondary power source or of the primary power source of the different sub-loads may be based on the obtained cost of power.

As another example, in some embodiments, the method 300 may include one or more operations related to obtaining one or more secondary power distribution factors for the particular time period for each of the sub-loads such as described above with respect to FIG. 1. In these or other embodiments, the connecting of the secondary power source or of the primary power source of the different sub-loads may be based on the obtained secondary power distribution factors such as described above.

One skilled in the art will appreciate that, for the selection unit 120, the method 300 and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of *In re Nuijten*, 500 F.3d 1346 (Fed. Cir. 2007). Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of supplying electrical power to a plurality of sub-loads, the method comprising:
    obtaining a power demand, for a particular time period, of each sub-load of a plurality of sub-loads in which each of the sub-loads is supplied primary power of a primary power source, the primary power supplied to each of the sub-loads being individually metered by a third party;
    obtaining an amount of available secondary power of a secondary power source that is available for the particular time period;
    connecting, during the particular time period, the secondary power source instead of the primary power source to a first subset of sub-loads of the plurality of sub-loads based on an aggregate power demand of the first subset of sub-loads being less than or equal to the amount of available secondary power;
    connecting, during the particular time period, the primary power source instead of the secondary power source to a particular sub-load of the plurality of sub-loads, the particular sub-load not being included in the first subset of sub-loads based on a sum of a particular demand of the particular sub-load and the aggregate power demand of the first subset of sub-loads exceeding the amount of available secondary power;
    comparing the first subset of sub-loads with a second subset of sub-loads of the plurality of sub-loads based on secondary power distribution factors;
    selecting the second subset of sub-loads based on the comparing;
    connecting, during a second time period, the secondary power source instead of the primary power source to the second subset of sub-loads based on the selecting of the second subset of sub-loads and an aggregate power demand of the second subset of sub-loads being less than or equal to the amount of available secondary power; and
    connecting, during the second time period, the primary power source instead of the secondary power source to the first subset of sub-loads based on the selecting of the second subset of sub-loads.

2. The method of claim 1, wherein the primary power includes alternating-current electrical power having one or more first electrical properties, and wherein the secondary power source supplies secondary power including alternating-current electrical power having one or more second electrical properties, and wherein connecting the secondary power source instead of the primary power source to the first subset of sub-loads includes:
    disconnecting the first subset of sub-loads from the primary power source;
    after disconnecting the first subset of sub-loads from the primary power source, connecting the first subset of sub-loads to the secondary power source; and
    synchronizing the secondary power with the primary power such that one or more of the one or more second electrical properties match one or more of the one or more first electrical properties prior to connecting the secondary power source to the first subset of sub-loads.

3. The method of claim 1, wherein obtaining the power demand, for the particular time period, of each sub-load of the plurality of sub-loads includes predicting the power demand of one or more sub-load of the plurality of sub-loads with respect to the particular time period.

4. The method of claim 3, wherein predicting the power demand is based on one or more of: historical data of the power demand, a weather forecast, a current season, a current day of the week, a current day of the year, and an event occurring during the particular time period.

5. The method of claim 1, wherein obtaining the amount of available secondary power that is available for the particular time period includes predicting the amount of available secondary power with respect to the particular time period.

6. The method of claim 5, wherein predicting the amount of available secondary power is based on one or more of: historical data of the amount of available secondary power, a weather forecast, a current season, and a conversion efficiency.

7. The method of claim 1, further comprising obtaining a cost of primary power for the particular time period for each of the sub-loads, and wherein connecting, during the particular time period, the secondary power source instead of the primary power source to the first subset of sub-loads of the plurality of sub-loads is based on the cost of primary power for the particular time period for one or more of the sub-loads.

8. The method of claim 7, wherein obtaining the cost of primary power for the particular time period comprises predicting the cost of primary power for the particular time period.

9. The method of claim 8, wherein predicting the cost of primary power is based on one or more of: historical data of the cost of primary power, a weather forecast, a current season, a current day of the week, a current day of the year, and an event occurring during the particular time period.

10. The method of claim 1, wherein the secondary power distribution factors includes one or more of: a first cost of primary power to a first sub-load of the first subset of sub-loads, a second cost of primary power to a second sub-load of the second subset of sub-loads, a first duration of time that the first sub-load has been connected to the secondary power source instead of the primary power source, a second duration of time that the second sub-load has been connected to the secondary power source instead of the primary power source, a first level of service of the first sub-load, and a second level of service of the second sub-load.

11. A system for supplying electrical power to a plurality of sub-loads, the system comprising:
one or more switching units; and
a selection unit communicatively coupled to the one or more switching units, the selection unit configured to perform operations comprising:
obtaining a power demand, for a particular time period, of each sub-load of a plurality of sub-loads in which each of the sub-loads is supplied primary power of a primary power source, the primary power supplied to each of the sub-loads being individually metered by a third party;
obtaining an amount of available secondary power of a secondary power source that is available for the particular time period;
directing the one or more switching units to connect, during the particular time period, the secondary power source instead of the primary power source to a first subset of sub-loads of the plurality of sub-loads based on an aggregate power demand of the first subset of sub-loads being less than or equal to the amount of available secondary power;
directing the one or more switching units to connect, during the particular time period, the primary power source instead of the secondary power source to a particular sub-load of the plurality of sub-loads, the particular sub-load not being included in the first subset of sub-loads based on a sum of a particular demand of the particular sub-load and the aggregate power demand of the first subset of sub-loads exceeding the amount of available secondary power;

comparing the first subset of sub-loads with a second subset of sub-loads of the plurality of sub-loads based on secondary power distribution factors;
selecting the second subset of sub-loads based on the comparing;
connecting, during a second time period, the secondary power source instead of the primary power source to the second subset of sub-loads based on the selecting of the second subset of sub-loads and an aggregate power demand of the second subset of sub-loads being less than or equal to the amount of available secondary power; and
connecting, during the second time period, the primary power source instead of the secondary power source to the first subset of sub-loads based on the selecting of the second subset of sub-loads.

12. The system of claim 11, wherein obtaining the power demand, for the particular time period, of each sub-load of the plurality of sub-loads includes predicting the power demand of each sub-load of the plurality of sub-loads with respect to the particular time period.

13. The system of claim 11, wherein obtaining the amount of available secondary power that is available for the particular time period includes predicting the amount of available secondary power with respect to the particular time period.

14. The system of claim 11, wherein the operations further comprise obtaining a cost of primary power for the particular time period for each of the sub-loads, wherein connecting, during the particular time period, the secondary power source instead of the primary power source to the first subset of sub-loads of the plurality of sub-loads is based on the cost of primary power for the particular time period for one or more of the sub-loads.

15. One or more computer-readable storage media including computer-executable instructions configured to cause a system to perform operations, the operations comprising:
obtaining a power demand, for a particular time period, of each sub-load of a plurality of sub-loads in which each of the sub-loads is supplied primary power of a primary power source, the primary power supplied to each of the sub-loads being individually metered by a third party;
obtaining an amount of available secondary power of a secondary power source that is available for the particular time period;
directing connection, during the particular time period, of the secondary power source instead of the primary power source to a first subset of sub-loads of the plurality of sub-loads based on an aggregate power demand of the first subset of sub-loads being less than or equal to the amount of available secondary power;
directing connection, during the particular time period, of the primary power source instead of the secondary power source to a particular sub-load of the plurality of sub-loads, the particular sub-load not being included in the first subset of sub-loads based on a sum of a particular demand of the particular sub-load and the aggregate power demand of the first subset of sub-loads exceeding the amount of available secondary power;
comparing the first subset of sub-loads with a second subset of sub-loads of the plurality of sub-loads based on secondary power distribution factors;
selecting the second subset of sub-loads based on the comparing;
connecting, during a second time period, the secondary power source instead of the primary power source to the second subset of sub-loads based on the selecting of the second subset of sub-loads and an aggregate power demand of the second subset of sub-loads being less than or equal to the amount of available secondary power; and connecting, during the second time period, the primary power source instead of the secondary power source to the first subset of sub-loads based on the selecting of the second subset of sub-loads.

16. The one or more computer-readable storage media of claim 15, wherein obtaining the amount of available secondary power that is available for the particular time period includes predicting the amount of available secondary power with respect to the particular time period.

17. The one or more computer-readable storage media of claim 15, wherein the operations further comprise obtaining a cost of primary power for the particular time period for each of the sub-loads, wherein connecting, during the particular time period, the secondary power source instead of the primary power source to the first subset of sub-loads of the plurality of sub-loads is based on the cost of primary power for the particular time period for one or more of the sub-loads.

* * * * *